(12) United States Patent
Thrasher et al.

(10) Patent No.: US 7,182,391 B2
(45) Date of Patent: Feb. 27, 2007

(54) MOTOR VEHICLE COVER

(76) Inventors: Steven Thrasher, 391 Sandhill Dr., Richardson, TX (US) 75080; John Bugg, 15705 Kingscrest Cir., Dallas, TX (US) 75248

( * ) Notice: Subject to any disclaimer, the term of this patent is extended or adjusted under 35 U.S.C. 154(b) by 0 days.

(21) Appl. No.: 10/928,544

(22) Filed: Aug. 26, 2004

(65) Prior Publication Data
US 2005/0093332 A1 May 5, 2005

Related U.S. Application Data

(60) Provisional application No. 60/497,865, filed on Aug. 26, 2003.

(51) Int. Cl.
*B60J 11/00* (2006.01)
(52) U.S. Cl. .............. 296/136.02; 296/136.07
(58) Field of Classification Search .......... 296/136.02, 296/136.07, 136.1, 136.13; 150/166
See application file for complete search history.

(56) References Cited

U.S. PATENT DOCUMENTS

| | | | | |
|---|---|---|---|---|
| 4,720,135 A * | 1/1988 | Farina | ................... | 296/136.03 |
| 5,401,074 A * | 3/1995 | Timerman | ............. | 296/136.02 |
| 5,820,201 A * | 10/1998 | Jabalee | .................. | 296/136.02 |
| 5,941,593 A * | 8/1999 | McCann | .................. | 296/136.1 |
| 6,070,629 A * | 6/2000 | Whiteside | .................... | 150/166 |
| 6,220,648 B1 * | 4/2001 | Daniel | ................... | 296/136.02 |
| 6,412,851 B1 * | 7/2002 | Burks et al. | ........... | 296/136.07 |
| 2001/0038226 A1 * | 11/2001 | Hoenack | ..................... | 296/136 |
| 2002/0145305 A1 * | 10/2002 | Bond | ......................... | 296/136 |

\* cited by examiner

*Primary Examiner*—Lori L. Coletta
(74) *Attorney, Agent, or Firm*—Thrasher Associates

(57) ABSTRACT

The invention provides an apparatus for protecting a motor vehicle surface. The invention includes a substantially uniform shock absorbent poly foam pad adapted to cover at least the top surface of a motor vehicle, and further adapted to couple to at least one means for securing. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

12 Claims, 8 Drawing Sheets

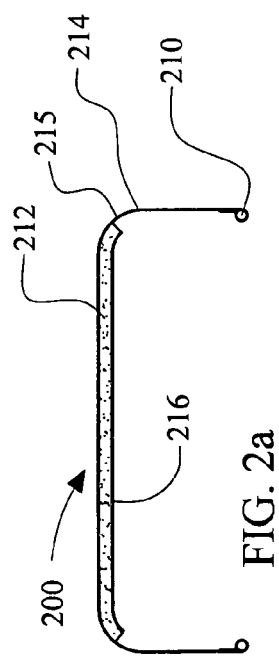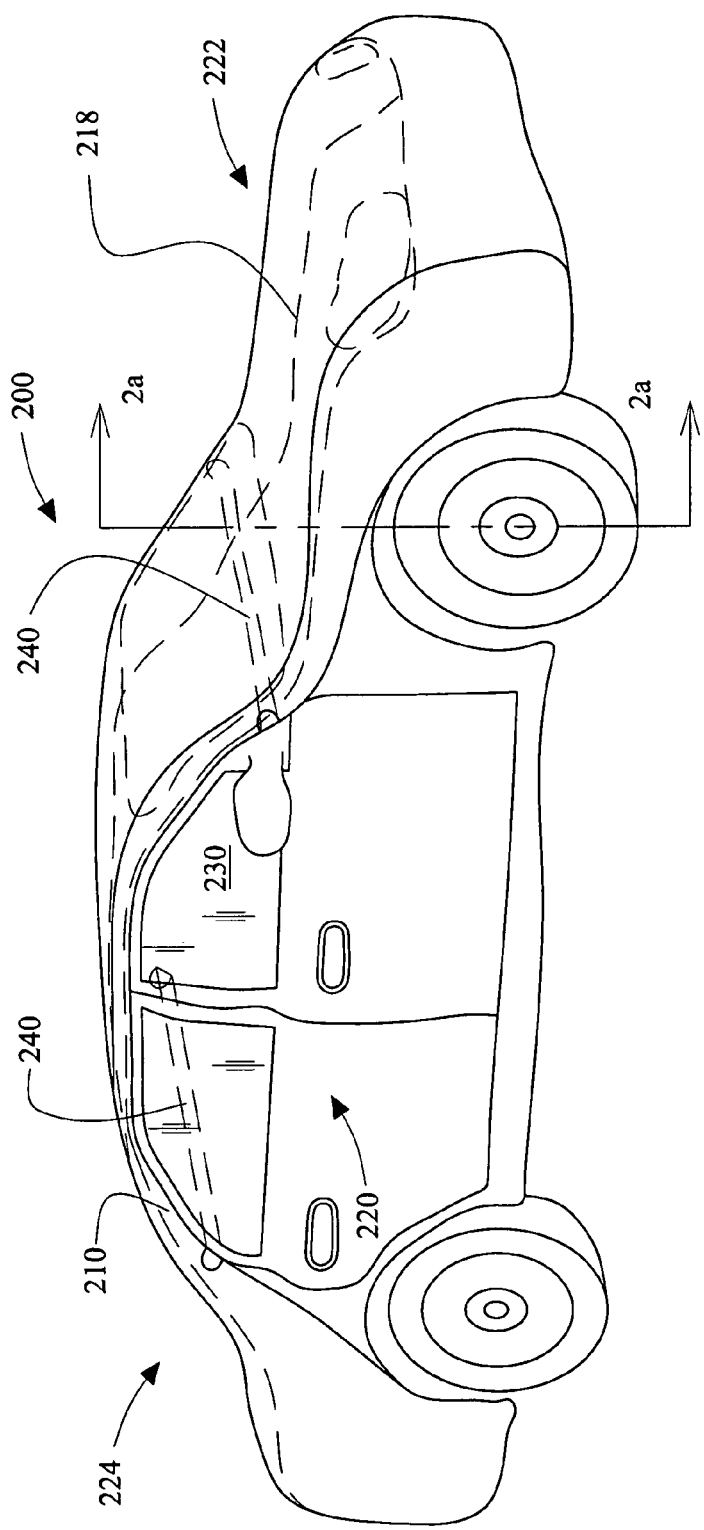

FIG. 4
FIG. 4a
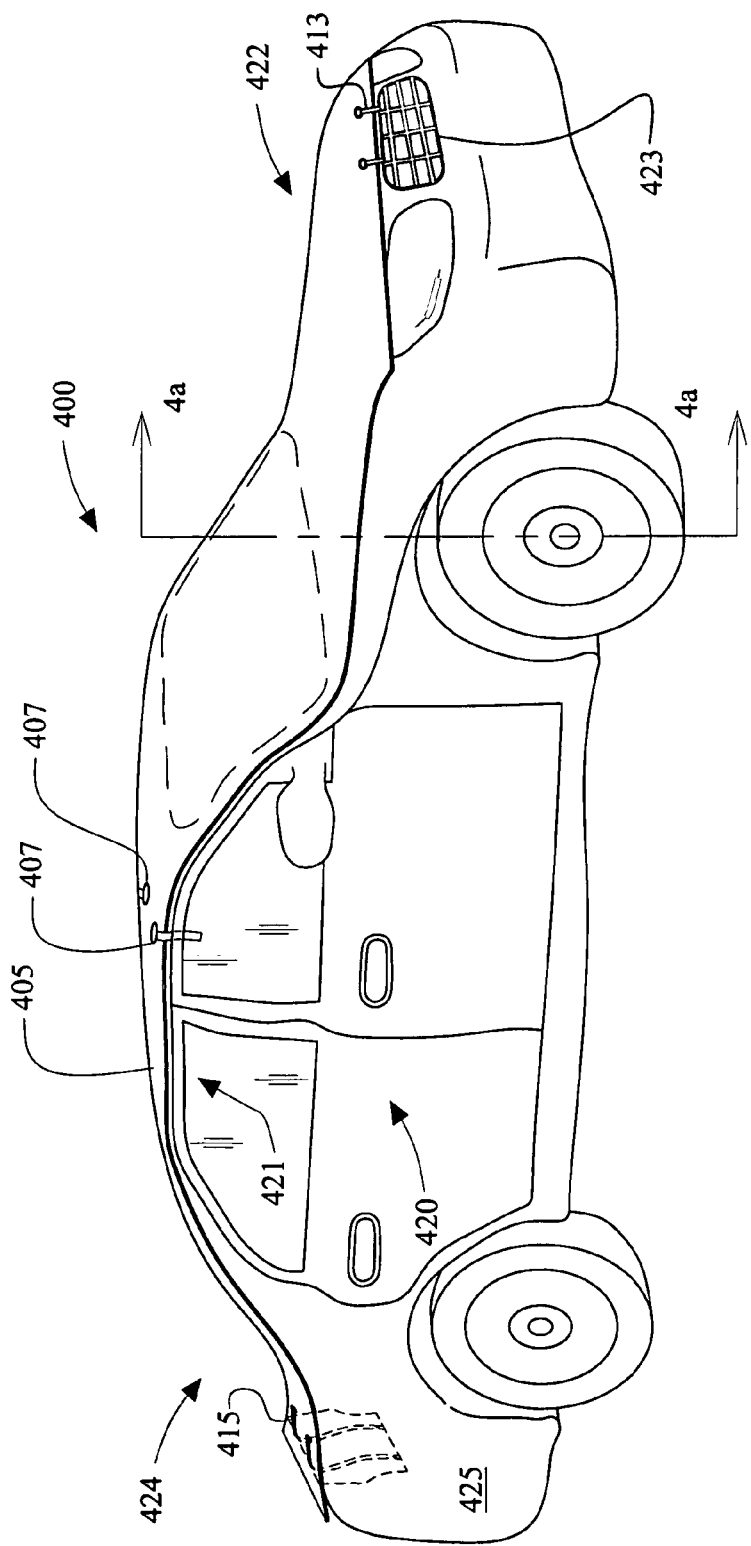
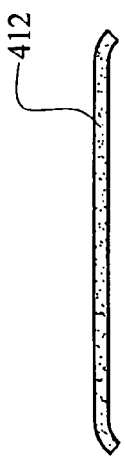

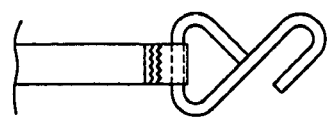
FIG. 9a
FIG. 9b
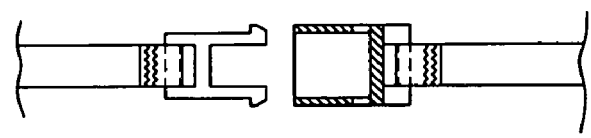
FIG. 9c
FIG. 9d
FIG. 9d
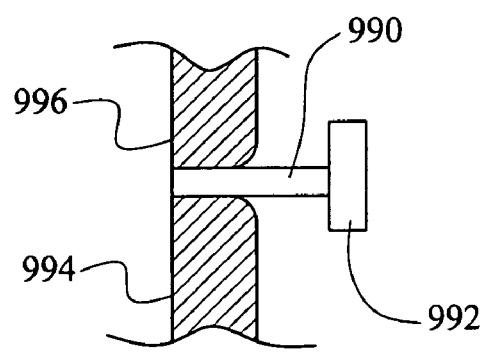

MOTOR VEHICLE COVER

CROSS-REFERENCE TO RELATED APPLICATION

The present invention is related to and claims priority from U.S. Provisional Patent Application No. 60/497,865 entitled MOTOR VEHICLE COVER, by Thrasher, et al., and which was filed on and has a priority date of 26 Aug. 2003.

TECHNICAL FIELD

The present invention relates to protective covers for motor vehicles.

STATEMENT OF A PROBLEM ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Motor vehicles, such as automobiles, trucks, SUVs, and motorcycles, are typically stored underneath structures to protect them from damage. However, unless the owner of the motor of the motor vehicle is near the structure that they use for protecting that motor vehicle, typically other structures are not available. Accordingly, when structures are not available to protect motor vehicles, the motor vehicle is typically left unprotected and subjected to a wide variety of environmental extremes. For example, motor vehicles may be pelted by small flying objects ranging in size from grains of sand to softball hail or rocks. Most persons are familiar with hail damage, and the sand and rock damage that can occur during sand storms, which frequently result in repair bills exceeding several thousand dollars for each motor vehicle. Many persons are also familiar with motor vehicle body damage caused by flying debris in high wind conditions, which occur in thunderstorms and tropical storms, for example. All of these and other elements may cause damage to a motor vehicle exposed to the environment.

It is known in the art to provide a protective cover to shield a vehicle from the environment. However, existing motor vehicle cover devices consist of complex, bulky, heavy, and sometimes even useless materials. Accordingly, existing protective covers have resulted in a crowded field of prior art which either fails to achieve the objective of protecting a motor vehicle body from damage, or either protects the motor vehicle body from damage at such a high cost either in terms of expense, bulk, or weight, that the use of the motor vehicle cover becomes impractical. Accordingly, the present invention provides a motor vehicle cover that substantially departs from the conventional concepts and designs of the prior art, and in so doing provides an apparatus that protects a motor vehicle body from damage caused by flying debris such as hail, and does so with low bulk, low weight, without requiring excessive installation procedures such as inflation, and at a cost that is affordable to the consumer.

BRIEF DESCRIPTION OF THE DRAWINGS

Various aspects of the invention, as well as an embodiment, are better understood by reference to the following detailed description. To better understand the invention, the detailed description should be read in conjunction with the drawings in which:

FIG. 2 shows a cover according to the invention, slightly larger than a footprint of the motor vehicle, adapted to securely fit about the motor vehicle;

FIG. 4 illustrates an alternative embodiment of the cover according to the invention, the cover being securely strapped to the front of the motor vehicle, securely strapped to an interior a trunk of the motor vehicle, and securely coupled a portion of the door frame of the motor vehicle via storm straps;

FIG. 9a shows a wire hook attachment means;

FIG. 9b illustrates a belt means for securing;

FIG. 9c illustrates a Velcro strapping means for securing;

FIG. 9d illustrates a hook means for securing; and

FIG. 9e illustrates a strap based means for securing.

EXEMPLARY EMBODIMENT OF A BEST MODE

Interpretation Considerations

Figure 1A:
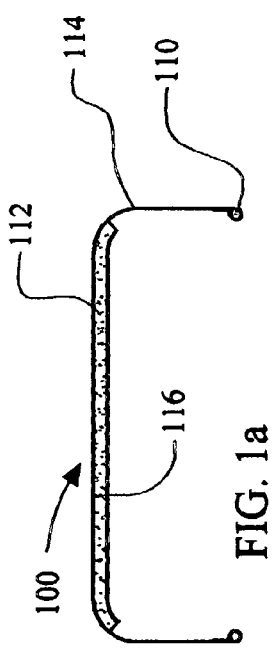
FIG. 1 illustrates a cover according to the invention adapted to securely fit about a motor vehicle.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the claims section. Sixth, the invention is also described in view of the Festo decisions, and, in that regard, the claims and the invention incorporate equivalents known, unknown, foreseeable, and unforeseeable. Seventh, the language and each word used in the invention should be given the ordinary interpretation of the language and the word, unless indicated otherwise. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

Materials

The invention utilizes novel materials to provide a superior car cover. The invention may incorporate polyester, nylon, vinyl, polyurethane films, polyethylene films, or other similarly foaming materials. In a preferred embodiment the invention comprises poly foam. A poly-foam may be generally defined as one of polyurethane, polyethylene, polyester, a poly carbon, or functional equivalents. In another preferred embodiment, the invention comprises a close-celled sponge rubber such as neoprene, nitrile, eppm, ensolype or blends of these materials. Alternatively, the invention may comprise close-celled flexible plastics such as cross pleat polyethylene foams. Further, the invention may comprise open celled sponge rubbers, specialty polymer blends, and may comprise layers of materials that are laminated together. Lamination materials may include polyester, nylon, vinyl leather, polyurethane films, polyethylene films, and additional materials. Alternatively, a hypur-cel material may be utilized with the invention such as a T-series Ether, an S-series Ester, or H-series hybrid. In each case, the thickness of the material is sufficient to prevent damage to a vehicle surface when struck by pea-sized hail traveling at the average hail terminal velocity as understood by those of ordinary skill in the meteorology arts. In one embodiment, such thickness is at least 1/16 of an inch. Of course, upon reading the present disclosure, it will become apparent to those of ordinary skill in the art to use similar and dissimilar materials as equivalent materials to those specifically disclosed herein, and these materials are incorporated within the scope of the invention, unless otherwise explicitly expressed in the claims.

DESCRIPTION OF THE FIGURES

Figure 1:
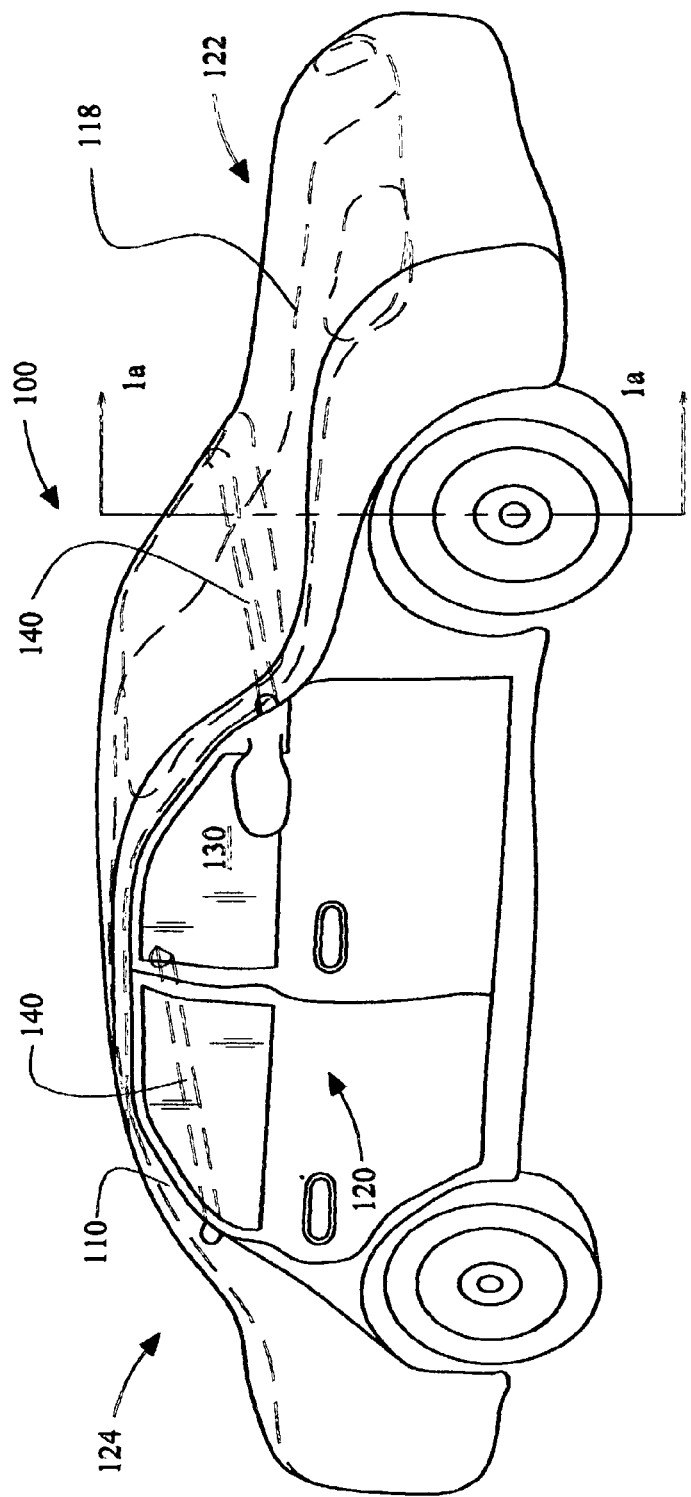

FIG. 1 provides one embodiment of one embodiment of one impact resistant damage cover. FIG. 1 shows one embodiment of the invention embodied as a fitted sheet style cover 100 having a means for attaching a pad 112 to a motor vehicle 120 embodied as a cord 110, such as an elastic cord or "pull cord" or equivalent structure or structural equivalent, that is disposed or embedded along the edge of the cover so that the cover may be fitted about the front 122 of a car 120 and the back 124 of the car 120 in a manner similar to a fitted sheet, and provides further detail via viewing the invention through cut line 1—1. The cord 110 is in one embodiment elastic, and in another embodiment may be manually tightened so that the cover 100 may be more effectively secured to the car 120. Of course, although a car is used for illustrative purposes here, the principles are applicable to any motor vehicle. One advantage of the fitted shield style cover 100 is that a single fitted style sheet cover 100 may cover a wide variety of sizes of motor vehicles. Optionally, to prevent the cover from rising up and away from the motor vehicle during high wind conditions, storm straps 140 are provided in one alternative embodiment.

A storm strap 140 is in one embodiment permanently attached to one location on the fitted sheet style cover 100 and then may pass within the interior 130 of the motor vehicle (by opening and shutting a car) and then securely attaches to the other side of the fitted sheet style cover 100 (in any manner described below, or readily apparent to those of ordinary skill in the art upon reading this disclosure, including means known, unknown, foreseeable and unforeseeable). In various embodiments, attachment may be via a belt, Velcro™, hiking or mounting climb style attachments, a hook, or other means for example. Further, optionally, in alternative embodiments an internal lining may be provided underneath the poly foam to protect the paint surface from scratches or other abrasions. Of course, although the cover 100 is illustrated as a single poly foam layer 112 it should be understood that multi-layer lamination poly foam may be coupled to a securing means such as a car cover 114, straps or equivalent structure or structural equivalent, and in an optional embodiment air may be injected between the two layers of poly foam either mechanically or in manufacture, as is readily understood by one of ordinary skill in the art upon reading the present disclosure. An optional internal lining 116 may be used to prevent paint scratching, and/or as a waterproof shield, and a foam seam 118 optionally allows for easy folding of the cover 100. Of course, variations and alternatives of the present embodiment are readily apparent to those of ordinary skill in the art upon reading the present disclosure, and such variations and alternatives including equivalent structures and structural equivalents are incorporated in the invention unless otherwise expressly indicated in the claims.

FIG. 2 illustrates a alternative embodiment of the impact resistant damage hail cover 200 having a fitted sheet style cover attachment means, and further detail via viewing the invention through cut line 2—2. A poly foam 212 covers substantially the foot print (footprints are readily understood by one of ordinary skill in the art) of a motor vehicle 220 and attachment to the motor vehicle front 222 and back 224 is achieved through a motor vehicle car cover attachment 214 embodied as a more traditional car cover material, such as vinyl, cloth, poly propylene, other tarp white-material, or equivalent structure or structural equivalent. One of advantages of the damage cover 200 shown in FIG. 2 is that it may be stored in a smaller area than the damage cover shown in FIG. 1. Accordingly, the damage cover FIG. 2 may be generally defined as poly foam sheet 212 that substantially covers at least the footprint of the motor vehicle 220, and a tarp like material 214 coupled to at least an edge 215 of the poly foam 212, the tarp like material 214 adapted to fit the front of the motor vehicle and the back of a motor vehicle via a elasticized strap or chord 210 running through in one embodiment the outermost edge 217 of the tarp like material 214. The invention may also incorporate foam 212 and/or an internal lining 216. Storm straps 240 that traverse the interior 230 of the motor vehicle 220 may also be incorporated into this embodiment. Of course, variations and alternatives of the present embodiment are readily apparent to those of ordinary skill in the art upon reading the present disclosure, and such variations and alternatives including equivalent structures and structural equivalents are incorporated in the invention unless otherwise expressly indicated in the claims.

Figure 3A:
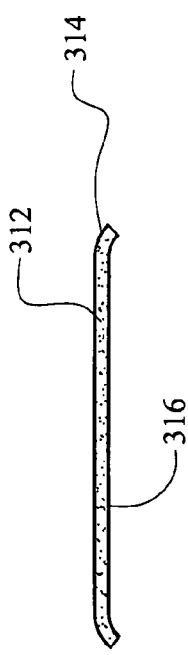
FIG. 3 illustrates a cover according to the invention, which covers a top portion of the motor vehicle, and securely straps to the body of the motor vehicle.
Figure 3:
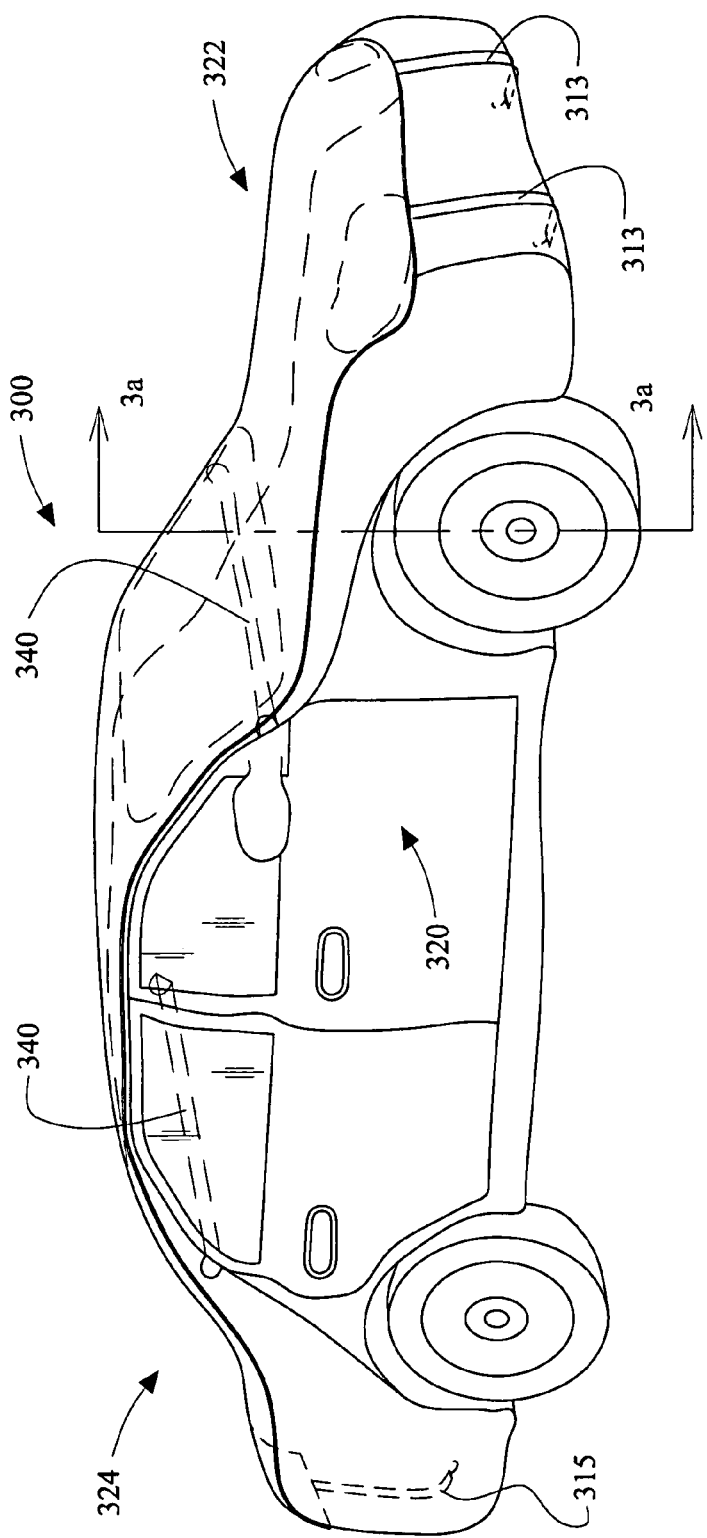

FIG. 3 illustrates an alternative embodiment of the damage cover 300 where a poly foam sheet covering the sub-stantially the footprint of the motor vehicle is securely strapped to a motor vehicle 320, having additional features taken along cut line 3—3. In FIG. 3, there are optional elasticized or tied strap members 313 attached to the portion of the damage cover to the front 322 of the vehicle 320, which couple to the body or chassis of the motor vehicle 320 at a pre-determined location. Similarly, the damage cover 300 has at a back portion 324 at least one tie down strap 315 for securing the damage cover to a portion of a motor vehicle 320. Like the earlier discussed embodiments of the invention, storm straps 340 are provided to prevent the damage cover from lifting away from the motor vehicle in the event of a high wind. As discussed previously, the present embodiment may incorporate foam 312, a car cover potion 314, and/or an internal lining 316. Of course, variations and alternatives of the present embodiment are readily apparent to those of ordinary skill in the art upon reading the present disclosure, and such variations and alternatives including equivalent structures and structural equivalents are incorporated in the invention unless otherwise expressly indicated in the claims.

FIG. 4 illustrates yet another embodiment of the invention shown as a damage cover 400 with additional detail shown in reference to cut line 4—4. The invention generally comprises a poly foam sheet 412 covering substantially the footprint of the motor vehicle, and having tie down anchors 407 for securing a center portion 405 of the cover 400. In addition, the foam sheet may be covered by or otherwise incorporate a car cover 414, and/or an internal lining 416. The present embodiment incorporates tie down straps 413 located proximate to the front 422 of the motor vehicle for secured damage cover to the motor vehicle via the grill 423 of the motor vehicle. Similarly, anchors 407 secure the cover 400 to the roof portion 421 of the motor vehicle 420, while tie down strap 415 secure the damage cover 400 to the trunk 425 of the motor vehicle 420. Of course, variations and alternatives of the present embodiment including equivalent structures and structural equivalents are readily apparent to those of ordinary skill in the art upon reading the present disclosure, and such variations and alternatives are incorporated in the invention unless otherwise expressly indicated in the claims.

Figure 5:
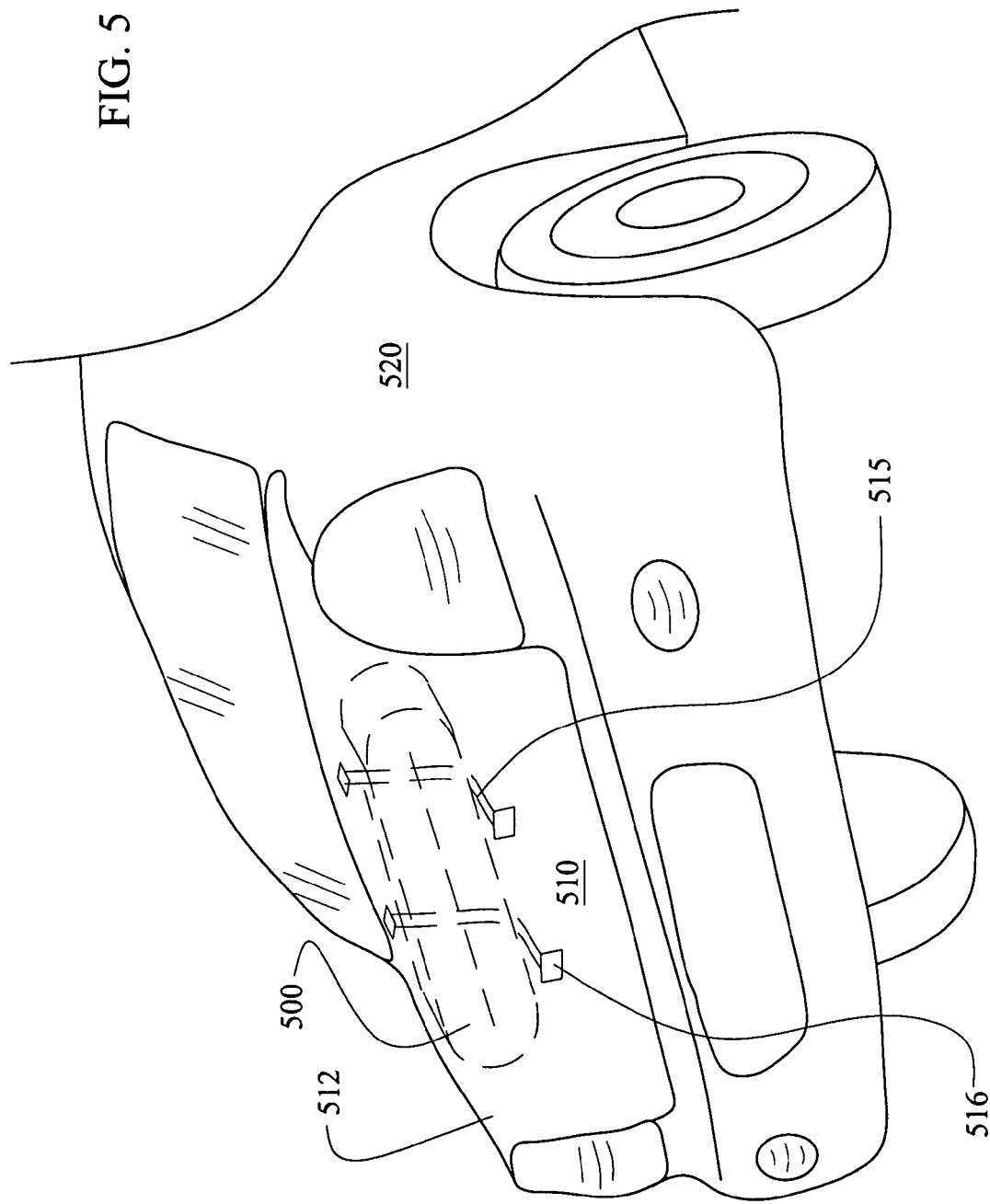
FIG. 5 illustrates a cover according to the invention being stored in a top portion of a trunk of a motor vehicle.

FIG. 5 shows that one embodiment of a damage cover 500 may be easily stored within the trunk 510 of the motor 520 vehicle by using straps 515, which may be the same straps that attach the damage cover to the motor vehicle 520. Accordingly, when it becomes necessary to quickly remove the damage cover 500 from the motor vehicle 520, in one embodiment, the user need only open the trunk lid 512 and remove one set of straps (not shown, which attach to the front of the vehicle) to loosen the damage cover 500 from the trunk 510. in one embodiment, the straps 515 that attach the damage cover 500 to the rear portion of the motor vehicle 520 stay secured within the trunk lid 512 of the motor vehicle 520 via strap attachments 516, such that a user need only remove the damage cover from the trunk of the motor vehicle and attach it to the rear of the motor vehicle is already accomplished. Then, the user may unroll the damage cover 500 from the trunk 510 of the motor vehicle 520, attach straps 515 to the front of the motor vehicle 520 or underneath the motor vehicle at a body attachment point or directly to the chassis, and then secure a central portion of the damage cover to the top of the car by opening a door, dropping a tie down strap anchor, and then closing the door to secure the tie down strap anchor and thus the damage cover to the motor vehicle. Of course, variations and alternatives of the present embodiment including equivalent structures and structural equivalents are readily apparent to those of ordinary skill in the art upon reading the present disclosure, and such variations and alternatives are incorporated in the invention unless otherwise expressly indicated in the claims.

Of course, it should be understood that the damage cover may in fact cover the entire vehicle and not just a top down foot print profile of the motor vehicle. Such coverage may be achieved via a single-unit cover, or via an inventive application that incorporates multiple covers that overlap or inter-lock to protect substantially all of a vehicle, such as an over-cover, a right-side cover, a left-side cover, and the like. Thus, the damage cover may comprise a plurality of sheets rather than a single sheet. In addition, the damage cover may have a first sheet which covers all of the top down foot print profile, and a second sheet which at least substantially covers a passenger side of the motor vehicle, and a third sheet which covers substantially all of the drivers side portion of the motor vehicle. Alternatively, the damage cover may comprise a plurality of sheets wherein a first sheet covers the top down footprint profile of the motor vehicle, a second covers the bendable metal portions of the passenger side of a motor vehicle, and the third sheet covers the bendable metal portions of the driver's side of the motor vehicle. Further, in a alternative embodiment, the damage cover may comprise a top portion which covers substantially all of the top down footprint of the motor vehicle, a second portion coupled to the first portion, the second portion covers the substantially all of vulnerable area of the passenger side of the motor vehicle, and a third portion integrally molded with the first portion which covers substantially all of the normal parts of the drivers side of the motor vehicle, the third portion being partially removable from the first portion to allow access to the interior of the motor vehicle. Removable attachment of the third portion to the first portion may be achieved through Velcro™, belts, snaps, a zipper, or other attachment means. Of course, variations and alternatives of the present embodiment including equivalent structures and structural equivalents are readily apparent to those of ordinary skill in the art upon reading the present disclosure, and such variations and alternatives are incorporated in the invention unless otherwise expressly indicated in the claims.

Figure 6:
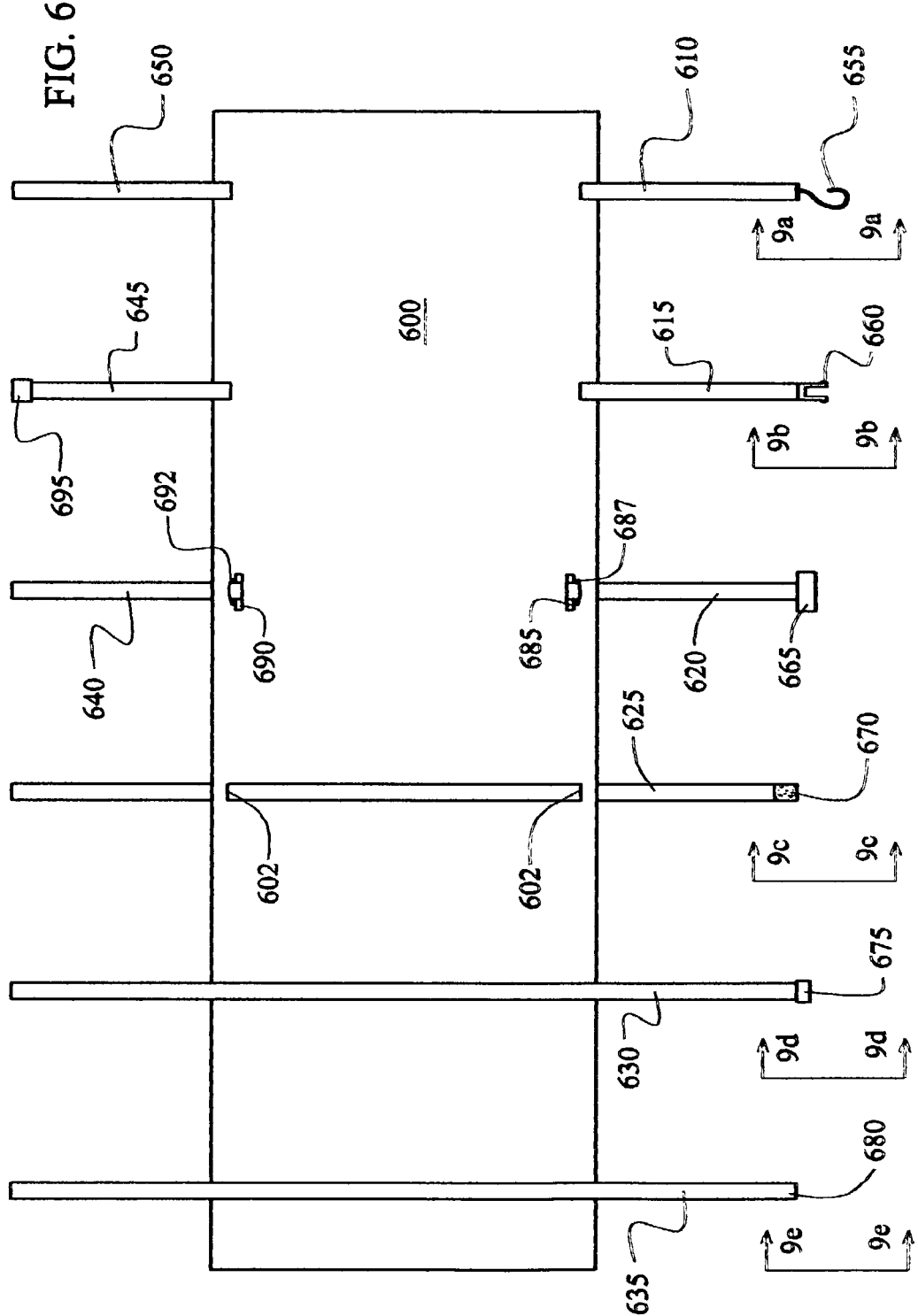
FIG. 6 illustrates an alternative embodiment of a cover according to the invention, the cover having a plurality of means for securing coupled to the pad.

FIG. 6 illustrates an alternative embodiment of a cover according to the invention, the cover having a plurality of means for securing coupled to the pad. Coupling of the attachment means to the car cover may be achieved with bonding, sewing, or looping of the straps to the car cover 600. The attachment means may include a hook 655, a clip 660, an anchor 665, a magnet 670, a flat hook 675, or may simply comprise the end 680 of a tie down strap 635. Of course, variations and alternatives of the means for securing are readily apparent to those of ordinary skill in the art upon reading the present disclosure, and such variations and alternatives including equivalent structures and structural equivalents are incorporated in the invention unless otherwise expressly indicated in the claims.

Figure 7:
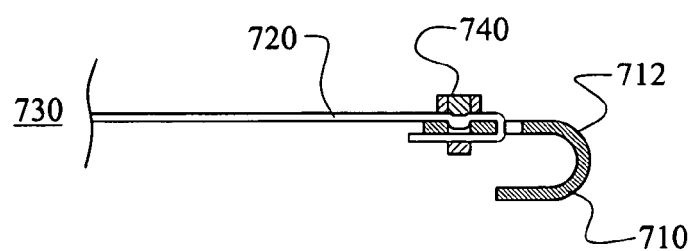
FIG. 7 illustrates an alternative tensioning means.

FIG. 7 illustrates one embodiment of a tensioning system for coupling a tie on strap to a motor vehicle. The tensioning system of FIG. 7 illustrates a hook 710 coupled to a tie down strap 720 being coupled to a car cover 730. The hook 710 is preferably covered with a rubberized material 712. A rubberized pin 740 couples the tie down strap 720 to the attachment means/hook 710. Of course, variations and alternatives of the tensioning system are readily apparent to those of ordinary skill in the art upon reading the present disclosure, and such variations and alternatives. including equivalent structures and structural equivalents are incorporated in the invention unless otherwise expressly indicated in the claims.

Figure 8A:
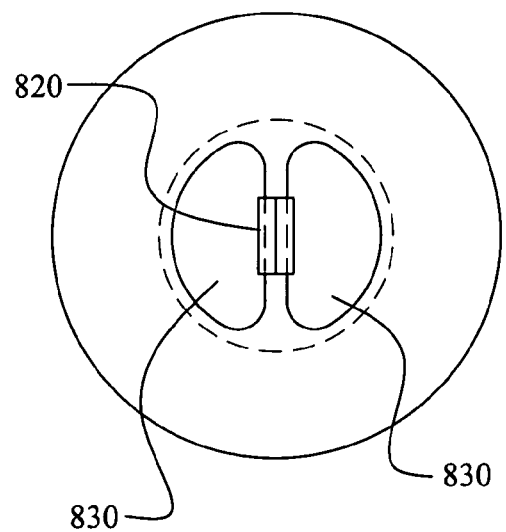
FIG. 8a illustrates a cover anchor according to the invention.
Figure 8B:
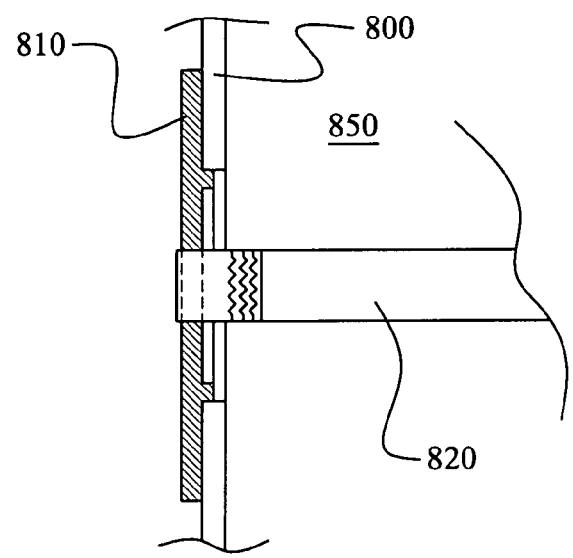
FIG. 8b illustrates the cover.

FIGS. 8a and 8b illustrate one embodiment of a system for coupling a tie down strap to a car cover. A poly foam anchor 810 is shown having a tie down strap 820 attached thereto. In a preferred embodiment access holes 830 are minimally sized such that a piece of hail or other object cannot easily fit through the hole 830, and/or sufficiently small that a hail strike or other object striking at a location approximate to the hole 830 or even on the hole 830 cannot damage the motor vehicle underneath the hole 830. In FIG. 8b an anchor 810 having a tie down strap 820 attached thereto as illustrated in FIG. 8a is shown securing a damage cover 800 to a motor vehicle surface 850. The strap 820 is lying approximate to the motor vehicle surface 850. Accordingly, in this embodiment, the hail cover 800 has a hole of sufficient size to allow a tie down strap 820 to pass there through, but small enough such that the anchor 810 is not passed they're through. Thus, the anchor holds the hail cover 800 to the motor vehicle surface 850 wherein the tie down strap 820 is secured to the motor vehicle. Of course, variations and alternatives of the means for securing including equivalent structures and structural equivalents are readily apparent to those of ordinary skill in the art upon reading the present disclosure, and such variations and alternatives are incorporated in the invention unless otherwise expressly indicated in the claims.

FIG. 9a through 9e illustrate alternative embodiments of motor vehicle attachment means. FIG. 9a illustrates a simple hook concept such that the hook may attach to the chassis of a motor vehicle, or to a hole underneath the motor vehicle perhaps in the motor vehicle body, or in the grill of the motor vehicle. FIG. 9b illustrates a snap belt type device such that the tie down straps of FIG. 9b are secured within the motor vehicle or underneath the motor vehicle or underneath a hood or trunk of the motor vehicle by snapping the two ends of the tie down straps together. Similarly, tie down straps may be secured inside the motor vehicle using a Velcro type attachment as illustrated in FIG. 9c. FIG. 9d shows a hook type attachment means. The hook may be made of sheet metal, metal, or plastic, or rubber, or nylon, or any other material. In FIG. 9e illustrates an anchor type attachment means whereby a tie down strap 990 and attached thereto an anchor portion 992 which is sufficiently fir to prevent the tie down strap from sliding out of a closed door, trunk, or hood. Such a system is shown in FIG. 9e as the tie down strap 990 with the anchor 992 securely nestled between a gap between a car hood 994 and a door 996. The strap 110 of FIG. 1 is also a means of securing a pad to a motor vehicle. Of course, variations and alternatives of the attachment means are readily apparent to those of ordinary skill in the art upon reading the present disclosure, and such variations and alternatives, including equivalent structures and structural equivalents are incorporated in the invention unless otherwise expressly indicated in the claims.

Of course, it should be understood that the order of the acts of the algorithms discussed herein may be accomplished in different order depending on the preferences of those skilled in the art, and such acts may be accomplished as software. Furthermore, though the invention has been described with respect to a specific preferred embodiment, many variations and modifications will become apparent to those skilled in the art upon reading the present application. It is therefore the intention that the appended claims and their equivalents be interpreted as broadly as possible in view of the prior art to include all such variations and modifications.

We claim:

1. An apparatus for protecting a motor vehicle surface, comprising:
    a non-inflating, substantially uniform shock absorbent poly foam pad of at least 1/16 inch thickness;
    the pad adapted to cover a motor vehicle footprint comprising a top surface of a motor vehicle;
    the pad comprises a first poly foam layer and a second poly foam layer;
    the pad further adapted to couple to at least one means for securing the pad to a motor vehicle; and
    means for securing the pad to a motor vehicle coupled to the pad, the means for securing further comprising motor vehicle attachment means.

2. An apparatus for protecting a motor vehicle surface, comprising:
    a plurality of substantially uniform shock absorbent poly foamed pads defined as a first pad and a second pad;
    the first pad being a non-inflating, substantially uniform shock absorbent poly foam pad of at least 1/16 inch thickness;
    the first pad adapted to cover a motor vehicle footprint comprising a top surface of a motor vehicle;
    the first pad further adapted to couple to at least one means for securing the pad to a motor vehicle; and
    means for securing the first pad to a motor vehicle coupled to the pad, the means for securing further comprising motor vehicle attachment means.

3. An apparatus for protecting a motor vehicle surface, comprising:
    a non-inflating, substantially uniform shock absorbent poly foam pad of at least 1/16 inch thickness;
    the pad adapted to cover a motor vehicle footprint comprising a top surface of a motor vehicle;
    the pad comprises a PVC rubber nitro compound;
    the pad further adapted to couple to at least one means for securing the pad to a motor vehicle; and means for securing the pad to a motor vehicle coupled to the pad, the means for securing further comprising motor vehicle attachment means.

4. An apparatus for protecting a motor vehicle surface, comprising;
a non-inflating, substantially uniform shock absorbent poly foam pad of at least 1/16 inch thickness;
the pad adapted to cover a motor vehicle footprint comprising a top surface of a motor vehicle;
the pad comprises an elastomer;
the pad further adapted to couple to at least one means for securing the pad to a motor vehicle; and
means for securing the pad to a motor vehicle coupled to the pad, the means for securing further comprising motor vehicle attachment means.

5. An apparatus for protecting motor vehicle surface, comprising:
a non-inflating, substantially uniform shock absorbent poly foam pad of at least 1/16 inch thickness;
the pad adapted to cover a motor vehicle footprint comprising a top surface of a motor vehicle;
the pad further adapted to couple to at least one means for securing the pad to a motor vehicle; and
means for securing the pad to a motor vehicle coupled to the pad, the means for securing further comprising motor vehicle attachment means;
the means for securing comprises an anchor coupled to a strap, and the motor vehicle attachment means coupled to the strap.

6. The apparatus of claim 5 wherein the anchor is plastic, that is adapted to couple to a vehicle frame.

7. The apparatus of claim 5 wherein the motor vehicle attachment means comprises a hook.

8. The apparatus of claim 5 wherein the motor vehicle attachment means comprises a magnet.

9. The apparatus of claim 5 wherein the motor vehicle attachment means comprises a door anchor.

10. The apparatus of claim 5 further comprising a slat remover coupled to the strap.

11. The apparatus of claim 5 wherein the means for securing is adapted to attach to a motor vehicle trunk surface.

12. The apparatus of claim 5 wherein the means for securing is adapted to compress the pad into a roll.

* * * * *